US012537154B2

(12) United States Patent
Lee

(10) Patent No.: US 12,537,154 B2
(45) Date of Patent: Jan. 27, 2026

(54) RELAY DRIVING APPARATUS FOR CONTROLLING OPERATION OF MULTIPLE SWITCHES

(71) Applicant: HANWHA SOLUTIONS CORPORATION, Seoul (KR)

(72) Inventor: Jae Geun Lee, Seoul (KR)

(73) Assignee: Hanwha Solutions Corporation, Seoul (KR)

( * ) Notice: Subject to any disclaimer, the term of this patent is extended or adjusted under 35 U.S.C. 154(b) by 119 days.

(21) Appl. No.: 18/561,174

(22) PCT Filed: Jun. 24, 2022

(86) PCT No.: PCT/KR2022/009000
§ 371 (c)(1),
(2) Date: Nov. 15, 2023

(87) PCT Pub. No.: WO2023/277455
PCT Pub. Date: Jan. 5, 2023

(65) Prior Publication Data

US 2024/0258056 A1 Aug. 1, 2024

(30) Foreign Application Priority Data

Jun. 29, 2021 (KR) ........................ 10-2021-0085099

(51) Int. Cl.
*H01H 47/32* (2006.01)
*H01H 9/54* (2006.01)
*H01H 47/02* (2006.01)

(52) U.S. Cl.
CPC .......... *H01H 47/325* (2013.01); *H01H 9/542* (2013.01); *H01H 47/02* (2013.01)

(58) Field of Classification Search
CPC ........ H01H 47/00; H01H 50/44; H01H 50/64; H01H 47/325; H01H 9/542; H01H 47/02; H01H 47/10; H01H 47/002; H01H 50/443
See application file for complete search history.

(56) References Cited

U.S. PATENT DOCUMENTS

2005/0024102 A1* 2/2005 Kondo ................ H01H 47/002 327/110
2008/0186645 A1* 8/2008 Morimoto ............ H01H 47/325 361/194

(Continued)

FOREIGN PATENT DOCUMENTS

CN 109300740 A 2/2019
DE 102004052349 A1 5/2006

(Continued)

OTHER PUBLICATIONS

International Search Report for International Application No. PCT/KR2022/009000 dated Oct. 5, 2022.

*Primary Examiner* — Danny Nguyen
*Assistant Examiner* — Nicolas Bellido
(74) *Attorney, Agent, or Firm* — Harness, Dickey & Pierce, P.L.C.

(57) ABSTRACT

The present disclosure provides a relay driving device including a relay including a relay switch and a relay coil magnetically coupled to the relay switch to turn on or off the relay switch; a controller for outputting a first control signal; a first switch for receiving the first control signal and being turned on or off to supply or block a first current to the relay coil; a control resistor connected between the relay coil and the first switch; a signal generator for receiving the first control signal and generating a second control signal; and a second switch receiving the second control signal and being (Continued)

turned on or off to supply or block a second current higher than the first current to the relay coil.

9 Claims, 3 Drawing Sheets

(56) References Cited

U.S. PATENT DOCUMENTS

| | | | | |
|---|---|---|---|---|
| 2015/0294822 | A1* | 10/2015 | Morimoto | H01H 47/325<br>361/160 |
| 2022/0293322 | A1* | 9/2022 | Seon | H01H 1/54 |

FOREIGN PATENT DOCUMENTS

| | | | | | |
|---|---|---|---|---|---|
| JP | 2014-120216 | A | | 6/2014 | |
| KR | 10-2016-0140293 | A | | 12/2016 | |
| KR | 10-2020-0068375 | A | | 6/2020 | |
| KR | 102142459 | B1 | * | 8/2020 | B60L 53/55 |
| KR | 102154635 | B1 | | 9/2020 | |
| KR | 10-2020-0134976 | A | | 12/2020 | |

* cited by examiner

RELAY DRIVING APPARATUS FOR CONTROLLING OPERATION OF MULTIPLE SWITCHES

CROSS-REFERENCE TO RELATED APPLICATION

This application is a national phase under 35 U.S.C. § 371 of PCT International Application No. PCT/KR2022/009000 which has an International filing date of Jun. 24, 2022, which claims priority to Korean Application No. 10-2021-0085099 filed Jun. 29, 2021 the entire contents of each of which are hereby incorporated by reference.

FIELD

The present disclosure relates to a relay driving device, and more particularly, to a relay driving device capable of reducing temperature during relay driving.

BACKGROUND

In general, a relay is provided on a power supply line between an energy storage device (e.g., a battery) and a load. Such a relay performs the function of selectively forming a closed circuit.

Additionally, the relay may include a relay driving circuit including a relay coil for switching operation.

Such a relay driving circuit is connected to the relay coil to supply current to the relay coil.

That is, the relay driving circuit operates to turn the relay switch on by energizing the relay coil, and to turn the relay switch off by de-energizing the relay coil.

In general, the operation of the relay driving circuit to energize or de-energize the relay coil is performed by a switching control operation of turning on or off a switch connected to the relay coil.

Meanwhile, since high current flows through the relay coil at the initial stage of the relay-on operation to secure the contact connection of the relay switch, and then, in the state of the contact connection of the relay switch, the connection state of the relay switch may be maintained even with low current, there is a demand for the relay driving circuit that flows low current to the relay coil to reduce the temperature of the relay.

To this end, a pulse width modulation (PWM) control method that applies a control signal to the switch in a pulse form is conventionally used, but this control method has a problem in that it adversely affects the reliability of the relay due to an electromagnetic interference (EMI) generated by the switching.

In addition, when the switch is controlled by outputting two control signals, an additional pin is required in the controller, and in particular, when the controller controls a plurality of relays, the number of pins as many as the number of relays must be provided.

SUMMARY

In order to solve the problems of the prior art as described above, the purpose of the present disclosure is to provide a relay driving device capable of reducing temperature of a relay.

Another purpose of the present disclosure is to provide a relay driving device capable of controlling a switching operation of two switches by sequentially outputting two control signals using one control signal.

The technical problems to be achieved in the present disclosure are not limited to the technical problems mentioned above, and other technical problems not mentioned can be clearly understood by a person with ordinary skills in the art to which the present disclosure belongs from the following description.

In order to solve the above problems, the present disclosure provides a relay driving device including a relay including a relay switch and a relay coil magnetically coupled to the relay switch to turn on or off the relay switch; a controller for outputting a first control signal; a first switch for receiving the first control signal and being turned on or off to supply or block a first current to the relay coil; a control resistor connected between the relay coil and the first switch; a signal generator for receiving the first control signal and generating a second control signal; and a second switch for receiving the second control signal and being turned on or off to supply or block a second current higher than the first current to the relay coil.

Here, the first switch may be turned on when the first control signal is at a high level, and may be turned off when the first control signal is at a low level, and the second switch may be turned on when the second control signal is at the high level, and may be turned off when the second control signal is at the low level.

In addition, the signal generator may include a time adjustment circuit for generating a third control signal delayed by the first control signal by a first time period or a second time period; and an XOR circuit for generating the second control signal of the high level when the first and third control signals are at different levels, and generating the second control signal of the low level when the first and third control signals are at the same level.

Here, the second time period may be shorter than the first time period.

In addition, when the controller outputs the first control signal of the high level, the first switch may be turned on, and the second switch may be turned on and then turned off after the first time period.

In addition, when the controller outputs the first control signal of the low level, the first switch may be turned off, and the second switch may be turned on and then turned off after the second time period.

In addition, when both the first and second switches are turned on, the second current may be supplied to the relay coil.

In addition, the time adjustment circuit may operate as a low pass filter consisting of a resistor and a capacitor.

In addition, the first or second time period may be determined by a resistance value of the resistor and a capacitance of the capacitor.

According to the present disclosure, high current can be flowed through the relay coil at the initial stage of the relay-on operation to secure contact connection of the relay switch, and then, even in the state of contact connection of the relay switch, the connection state of the relay switch can be maintained even with low current, so the low current can be flowed through the relay coil to reduce the temperature of the relay.

In addition, according to the present disclosure, when one control signal is outputted from the controller during the control operation, two control signals can be sequentially outputted to control switching operation of the two switches.

Accordingly, the present disclosure may prevent the influence of an electromagnetic interference (EMI) generated in a conventional Pulse Width Modulation (PWM) control for applying a control signal in a pulse form, and has an advantage that additional pins required by conventional controllers to output two control signals are unnecessary.

The effects obtained in the present disclosure are not limited to the effects mentioned above, and other effects not mentioned can be clearly understood by a person with ordinary skills in the art to which the present disclosure belongs from the following description.

DETAILED DESCRIPTION

The above objects, means, and effects of the present disclosure will become more apparent through the following detailed description of the accompanying drawings, and accordingly, those skilled in the art can easily implement the technical idea of the present disclosure. In addition, in describing the present disclosure, a detailed description of known techniques related to the present disclosure is omitted when it is determined that the gist of the present disclosure may be unnecessarily obscured.

In this specification, terms such as "or" and "at least one" may represent one of words listed together, or a combination of two or more. For example, "A or B" and "at least one of A and B" may include only A or B, or both A and B.

In this specification, terms such as 'first' and 'second' may be used to describe various components, but the components should not be limited by the above terms. Additionally, the above term should not be interpreted as limiting the order of each component, but may be used for the purpose of distinguishing one component from another component. For example, a 'first component' may be named a 'second component', and similarly, a 'second component' may also be named a 'first component'.

Hereinafter, preferred embodiments of the present disclosure will be described in detail with reference to the accompanying drawings.

Figure 1:
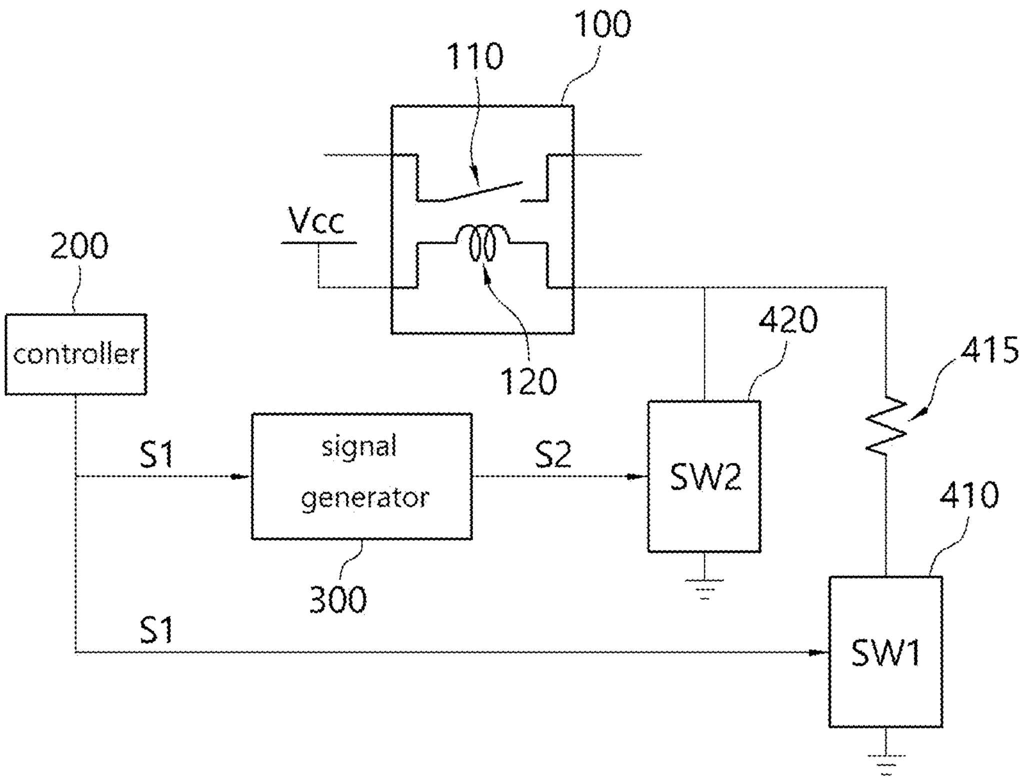
FIG. 1 is a schematic block diagram of a relay driving device according to an embodiment of the present disclosure.

FIG. 1 is a schematic block diagram of a relay driving device according to an embodiment of the present disclosure.

Referring to FIG. 1, the relay driving device according to the embodiment of the present disclosure may include a relay 100, a controller 200, a first switch 410, a control resistor 415, a signal generator 300, and a second switch 420.

The relay 100 may include a relay switch 110 and a relay coil 120. Here, the relay coil 120 is magnetically coupled to the relay switch 110 and serves to turn on or off the relay switch 110.

For example, when a current of a predetermined magnitude or more flows through the relay coil 120, a magnetic force is generated, and the contact of the relay switch 110 is opened or closed by the magnetic force.

The controller 200 may output a first control signal S1 to control the driving of the relay 100.

A driving voltage Vcc is applied to one end of the relay coil 120, and one ends of the first switch SW1, 410 and the second switch SW2, 420 are connected in parallel to the other end of the relay coil 120, respectively.

And, the other ends of the first switch SW1, 410 and the second switch SW2, 420 are connected to ground, respectively, and a control resistor 415 is connected between the relay coil 120 and the first switch 410.

Here, when the first switch 410 is turned on, a current path is formed along the relay coil 120 and the first switch 410, and when the second switch 420 is turned on, a current path is formed along the relay coil 120 and the second switch 420.

In addition, when both the first switch 410 and the second switch 420 are turned on, a current path is formed along the relay coil 120 and the second switch 420 due to the control resistor 415.

The first switch 410 receives the first control signal S1 from the controller 200 and then is turned on or off to supply or block a first current to the relay coil 120.

The signal generator 300 may receive the first control signal S1 to generate a second control signal S2. The detailed description will be given below.

The second switch 420 may receive the second control signal S2 from the signal generator 300 and then be turned on or off to supply or block a second current to the relay coil 120. Here, the second current is higher than the first current due to the control resistor 415.

The first switch 410 is turned on when the first control signal S1 is at a high level, and is turned off when the first control signal S1 is at a low level. Also, the second switch 420 is turned on when the second control signal S2 is at a high level, and is turned off when the second control signal S2 is at a low level.

In addition, when only the first switch 410 of the first switch 410 and the second switch 420 is turned on, the first current flows in the relay coil 120, and when only the second switch 420 is turned on, the second current flows in the relay coil 120. On the other hand, when both the first switch 410 and the second switch 420 are turned on, the second current is supplied to the relay coil 120 due to the control resistor 415.

Figure 2:
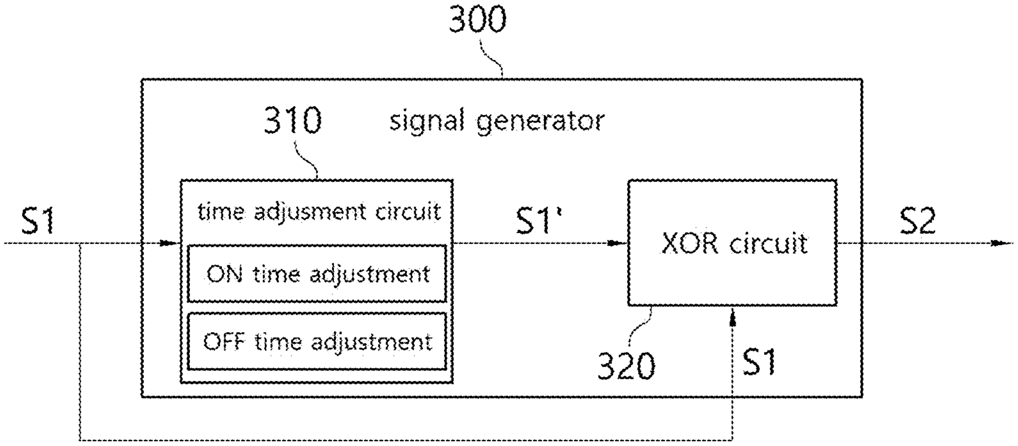
FIG. 2 is a detailed block diagram of a signal generator of a relay driving device according to an embodiment of the present disclosure.

FIG. 2 is a detailed block diagram of a signal generator of a relay driving device according to an embodiment of the present disclosure.

Referring to FIG. 2, the signal generator 300 may include a signal adjustment circuit 310 and an XOR circuit 320.

Specifically, the time adjustment circuit 310 may generate a third control signal $1' delayed by the first control signal S1 by a first time period T1 or a second time period T2.

Here, the time adjustment circuit 310 may operate as a low pass filter (LPF) consisting of a resistor and a capacitor.

In addition, the XOR circuit 320, as a logic circuit, receives the first control signal S1 from the controller 200, receives the third control signal S1' from the time adjustment circuit 310, generates the second control signal S2 of a high level when the first control signal S1 and the third control signal S1' are at different levels, and generates the second control signal S2 of a low level when the first control signal S1 and the third control signal S1' are at the same level.

Figure 3:
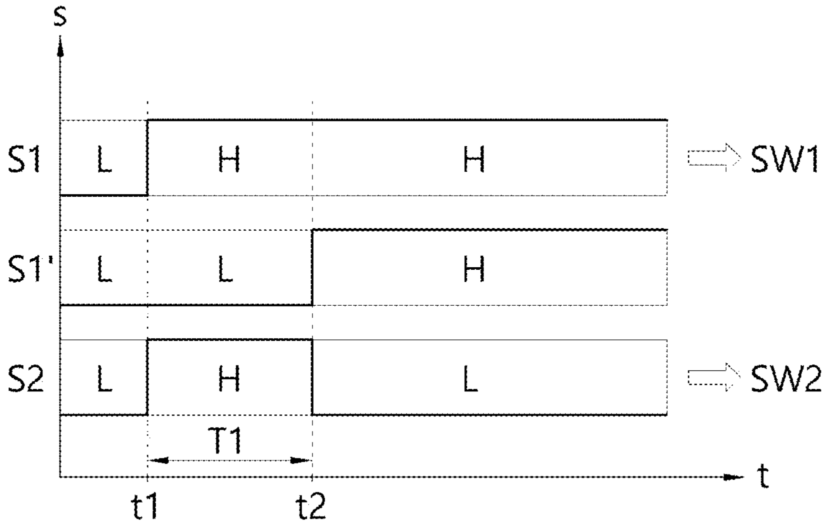
FIG. 3 is a graph showing a signal flow during a relay-on operation of a relay driving device according to an embodiment of the present disclosure.
Figure 4:
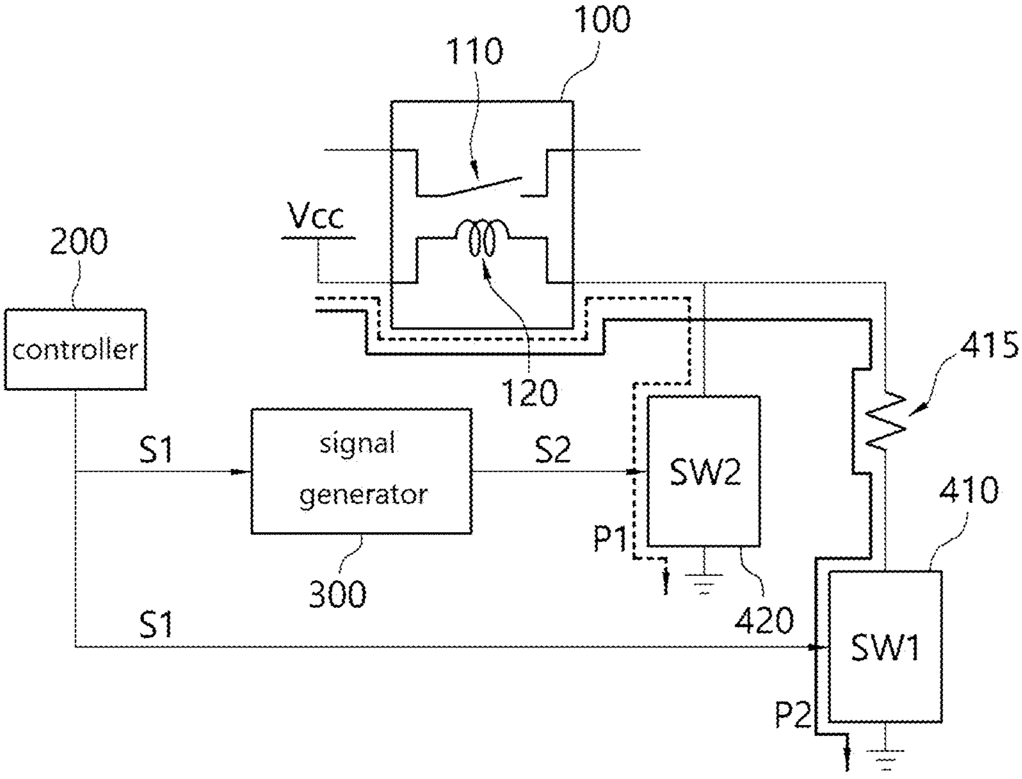
FIG. 4 is a diagram showing an operation flow during a relay-on operation of a relay driving device according to an embodiment of the present disclosure.

FIG. 3 is a graph showing a signal flow during a relay-on operation of a relay driving device according to an embodiment of the present disclosure, and FIG. 4 is a diagram showing an operation flow during a relay-on operation of a relay driving device according to an embodiment of the present disclosure.

Referring to FIGS. 3 and 4, when the controller 200 outputs the first control signal S1 of a high level, the first switch 410 is turned on, and the second switch 420 is turned on and then turned off after a first time period T1.

Specifically, when the controller 200 outputs the first control signal S1 of the high level at time t1, the first switch 410 receives the first control signal S1 of the high level at time t1 and is turned on immediately. That is, the first control signal maintains a low level and is converted to the high level at time t1.

In addition, the time adjustment circuit 310 receives the first control signal S1 at time t1 and delays the first control signal S1 by the first time period T1 and outputs the third control signal St' of the high level at time t2. That is, the third control signal S1' maintains a low level and is converted to the high level at time t2.

In addition, the XOR circuit 320 receives the first control signal S1 of the high level and the third control signal S1' of the low level at time t1 and receives the first control signal S1 of the high level and the third control signal S1' of the high level at time t2.

Accordingly, the XOR circuit 320 outputs the second control signal S2 of the high level at time t1 and outputs the second control signal S2 of the low level at time t2. That is, the second control signal S2 maintains the low level and is converted to the high level at time t1 and is converted to the low level at time t2.

Referring to FIG. 4, both the first switch 410 and the second switch 420 are turned on at time t1, and a current path (indicated by a dotted line) is formed along the relay coil 120 and the second switch 420 due to the control resistor 415.

Thereafter, the first switch 410 is maintained in an on state, and the second switch 420 is turned off at time t2, and a current path (indicated by a solid line) is formed along the relay coil 120 and the first switch 410.

Here, the magnitude of the current flowing through the current path indicated by the dotted line due to the control resistor 415 is greater than that of the current flowing through the current path indicated by the solid line.

As described above, the relay driving device according to the embodiment of the present disclosure may secure the contact point connection of the relay switch 110 by flowing high current through the relay coil 120 at the initial state of the relay-on operation. After that, the connection state of the relay switch 110 may be maintained even with a low current, so the temperature of the relay 100 may be reduced by flowing the low current through the relay coil 120.

In addition, the relay driving device according to the embodiment of the present disclosure may control the on operation of the first switch 410 and the second switch 420 by sequentially outputting the first control signal S1 and the second control signal S2 when the controller 200 outputs one first control signal S1 during the control operation process.

Accordingly, the present disclosure may prevent the influence of an electromagnetic interference (EMI) generated in a conventional Pulse Width Modulation (PWM) control for applying a control signal in a pulse form, and has an advantage that additional pins required by a conventional controller to output two control signals are unnecessary.

Figure 5:
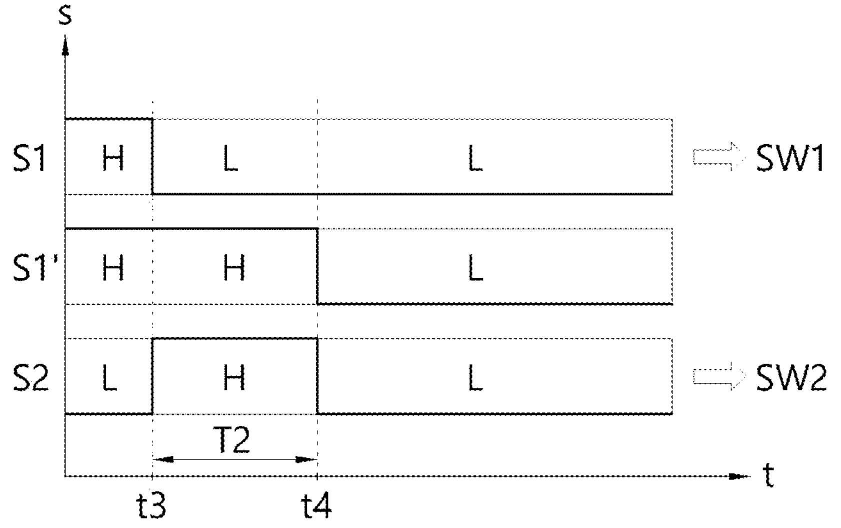
FIG. 5 is a graph showing a signal flow during a relay-off operation of a relay driving device according to an embodiment of the present disclosure.
Figure 6:
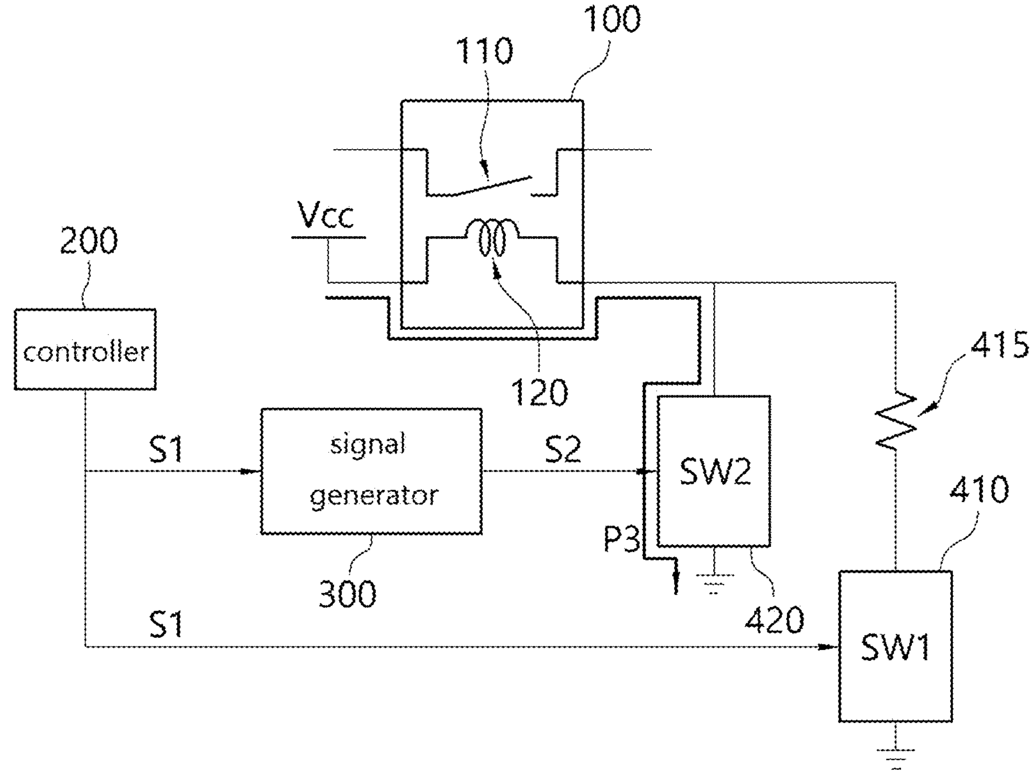
FIG. 6 is a diagram showing an operation flow during a relay-off operation of a relay driving device according to an embodiment of the present disclosure.

FIG. 5 is a graph showing a signal flow during a relay-off operation of a relay driving device according to an embodiment of the present disclosure, and FIG. 6 is a diagram showing an operation flow during a relay-off operation of a relay driving device according to an embodiment of the present disclosure.

Referring to FIGS. 5 and 6, when the controller 200 outputs a first control signal S1 of a low level, the first switch 410 is turned off, and the second switch 420 is turned on and then turned off after a second time period T2.

Specifically, when the controller 200 outputs the first control signal S1 of the low level at a time t3, the first switch 410 receives the first control signal of the low level at the time t3 and turns off immediately. That is, the first control signal S1 maintains the high level and is converted to the low level at the time t3.

The time adjustment circuit 310 receives the first control signal S1 at the time t3 and delays the first control signal S1 by the second time period T2 and outputs the third control signal S1' of the low level L at the time t4. That is, the third control signal S1' maintains the high level and is converted to the low level at the time t4.

Then, the XOR circuit 320 receives the first control signal S1 of the low level L and the third control signal S1' of the high level H at the time t3, and receives the first control signal S1 of the low level L and the third control signal S1' of the low level L at the time t4.

Accordingly, the XOR circuit 320 outputs the second control signal S2 of the high level H at the time t3 and outputs the second control signal S2 of the low level L at the time t4. That is, the second control signal S2 maintains the low level and is converted to the high level at the time t3 and is converted to the low level at the time t4.

Referring to FIG. 6, at the time t3, the first switch 410 is turned off and the second switch 420 is turned on, so that a current path (indicated by a solid line) is formed along the relay coil 120 and the second switch 420.

Thereafter, at time t4, the second switch 420 is turned off, so that no current flows through the relay coil 120.

As described above, in the relay driving device according to the embodiment of the present disclosure, when the controller 200 outputs one first control signal S1, the first control signal S1 and the second control signal S2 are sequentially output, so that the off operation of the first switch 410 and the second switch 420 may be controlled.

Accordingly, the present disclosure may prevent the influence of an electromagnetic interference (EMI) generated in a conventional Pulse Width Modulation (PWM) control for applying a control signal in a pulse form, and has an advantage that additional pins required by conventional controller to output two control signals are unnecessary.

On the other hand, when the relay 100 is turned on, high current must be supplied to the relay coil 120 for several ms or more to ensure contact connection of the relay switch 110. On the contrary, when the relay 100 is turned off, the relay must be immediately reacted by a control signal to ensure reliability.

To this end, as shown in FIG. 2, the time adjustment circuit 310 according to an embodiment of the present disclosure may adjust the ON time and the OFF time by differently setting the first time interval T1 and the second time interval T2.

For example, the time adjustment circuit 310 may set the first time period T1 longer than several ms to secure the relay contact time, and set the second time period T2 as short as possible to adjust the relay off time.

Here, the first time period T1 or the second time period T2 may be determined by the resistance value of the resistor and the capacitance of the capacitor constituting the time adjustment circuit 310. To this end, a variable resistor or a variable capacitor may be used.

In particular, the time adjustment circuit 310 preferably sets the second time period shorter than the first time period.

That is, the time adjustment circuit 310 may secure the contact connection of the relay switch 110 by supplying high current to the relay coil 120 during the relatively long first time period when the relay 100 is driven on. In addition, when the relay 100 is driven off, the relay may secure the reliability of the relay by blocking the current of the relay coil 120 after the relatively short second time period after the control signal supply.

Although the detailed description of the present disclosure has been given with specific embodiments, it is of course that various modifications can be made without departing from the scope of the present disclosure. Therefore, the scope of the present disclosure is not limited to the described embodiments, and should be determined by the claims and equivalents from the claims.

The relay driving device according to the present disclosure may be applied to an electronic device such as an energy storage device.

What is claimed is:

1. A relay driving device comprising:

a relay including a relay switch and a relay coil magnetically coupled to the relay switch to turn on or off the relay switch;

a controller for outputting a first control signal;

a first switch for receiving the first control signal and being turned on or off to supply or block a first current to the relay coil;

a control resistor connected between the relay coil and the first switch;

a signal generator for receiving the first control signal and generating a second control signal; and a second switch for receiving the second control signal and being turned on or off to supply or block a second current higher than the first current to the relay coil wherein the signal generator comprises, a time adjustment circuit for generating a third control signal delayed by the first control signal by a first time period or a second time period; and an XOR circuit for generating the second control signal of a high level when the first and third control signals are at different levels, and generating the second control signal of a low level when the first and third control signals are at a same level.

2. The relay driving device of claim 1, wherein the first switch is turned on when the first control signal is at a high level, and is turned off when the first control signal is at a low level, and the second switch is turned on when the second control signal is at the high level, and is turned off when the second control signal is at the low level.

3. The relay driving device of claim 1, wherein the time adjustment circuit adjusts the first time period and the second time period.

4. The relay driving device of claim 1, wherein the second time period is shorter than the first time period.

5. The relay driving device of claim 1, wherein when the controller outputs the first control signal of the high level, the first switch is turned on, and the second switch is turned on and then turned off after the first time period.

6. The relay driving device of claim 1, wherein when the controller outputs the first control signal of the low level, the first switch is turned off, and the second switch is turned on and then turned off after the second time period.

7. The relay driving device of claim 6, wherein when both the first and second switches are turned on, the second current is supplied to the relay coil.

8. The relay driving device of claim 1, wherein the time adjustment circuit operates as a low pass filter consisting of a resistor and a capacitor.

9. The relay driving device of claim 1, wherein the first or second time period is determined by a resistance value of the resistor and a capacitance of a capacitor.

* * * * *